United States Patent [19]

Plumat

[11] 3,938,979
[45] Feb. 17, 1976

[54] METHOD AND APPARATUS FOR VERTICALLY DRAWING A GLASS RIBBON

[75] Inventor: Emile Plumat, Gilly, Belgium

[73] Assignee: Glaverbel-Mecaniver, Watermael-Boitsfort, Belgium

[22] Filed: Aug. 1, 1974

[21] Appl. No.: 493,888

Related U.S. Application Data

[63] Continuation of Ser. No. 326,043, Jan. 23, 1973, abandoned.

[30] Foreign Application Priority Data

Jan. 24, 1972 Luxemburg .......................... 64654

[52] U.S. Cl. .................. 65/90; 65/182 R; 65/204; 65/344; 65/196
[51] Int. Cl.² ........................................ C03B 15/04
[58] Field of Search ............ 65/204, 182 R, 196, 90, 65/344, 345

[56] References Cited

UNITED STATES PATENTS

| | | | |
|---|---|---|---|
| 3,218,143 | 11/1965 | De Lauarte .................. | 65/182 R X |
| 3,558,295 | 1/1971 | Bezombes et al. ............ | 65/182 R X |

FOREIGN PATENTS OR APPLICATIONS

| | | | |
|---|---|---|---|
| 251,160 | 8/1969 | U.S.S.R. .............................. | 65/344 |

*Primary Examiner*—Arthur D. Kellogg
*Attorney, Agent, or Firm*—Spencer & Kaye

[57] ABSTRACT

In the manufacture of sheet glass by drawing a ribbon of glass upwardly from a molten glass bath via a meniscus located at the glass surface in the drawing zone, a pool of molten material is contained in the bath beneath the drawing zone by a refractory member and the molten material pool is thermally conditioned to maintain a predetermined temperature profile in at least part of the drawing zone.

17 Claims, 11 Drawing Figures

METHOD AND APPARATUS FOR VERTICALLY DRAWING A GLASS RIBBON

CROSS REFERENCE TO RELATED APPLICATION

This application is a continuation of application Ser. No. 326,043, filed Jan. 23rd, 1973, now abandoned.

BACKGROUND OF THE INVENTION

This invention relates to a process of manufacturing flat glass. The invention particularly relates to a process involving drawing glass upwardly as a continuous ribbon from a bath of molten glass via a drawing meniscus located at the surface of such bath in a drawing zone into which currents of glass flow in respectively opposite directions along such surface. One such surface current, the forward current, flows into such zone from a region to which molten glass is continuously supplied. The invention also relates to apparatus for use in carrying out this process.

In the drawing of flat glass, numerous problems are encountered in controlling the thermal conditions associated with the supply of molten glass and existing in the environment to which the glass is exposed while being drawn. Such control must be exerted in order to produce flat glass with acceptable optical and surface properties. Ideally, the faces of the drawn ribbon of flat glass should be truly flat and parallel at all positions across the glass surface. In practice, this ideal quality can not be realized under industrial conditions.

It is possible, by employing various known measures to reduce the disparities in temperature which tend to arise between one part of the glass and another, to produce flat glass of reasonably high quality insofar as its geometry is concerned. The environmental influences on flat glass formation are, however, numerous and subtle and in the flat glass manufacturing industry efforts are being continuously made to discover new techniques either for the purpose of still further improving the realizable quality of the flat glass or for enabling flat glass of a given quality to be produced more easily or cheaply.

The quality of the end product is particularly liable to be influenced by the thermal and rheological conditions which prevail in the region of critical formation of the ribbon, i.e., in and immediately above the drawing zone where the molten glass is drawn upwardly from the surface of the supply of molten glass and into the ribbon via a meniscus, which is established at the bottom of the glass ribbon by the drawing action on the glass.

It is well known that it is important for the position of the meniscus to be stabilized because otherwise the geometry of the drawn ribbon would be highly irregular. In order to stabilize the position of the meniscus, it is the practice in some glass drawing processes of the kind with which the present invention is concerned to provide a draw bar which is immersed in the bath of molten glass a short distance below the surface of such bath at the drawing zone. The forward surface current of molten glass flows over that draw bar and directly feeds the front side of the glass ribbon, i.e., the side facing toward that region to which molten glass is continuously supplied to the bath, whereas the glass which feeds the rear side of the ribbon initially flows under the draw bar and then flows back over it in the opposite direction.

However, it is not only the position of the meniscus which is important but also the viscosity profile of the molten glass forming the meniscus at any given moment. There is a natural tendency for thermal gradients to exist in the meniscus. For example, there is often an appreciable difference between glass flowing into the meniscus at the central part of the length of the drawing zone, measured in a direction normal to the direction of flow of the surface currents feeding the main faces of the ribbon, and the molten glass flowing into the end region of the drawing zone and thus feeding the margins of the ribbon. There is also often a tendency for the temperature of the forward surface current flowing via the meniscus into the front face of the ribbon to be higher than the molten glass flowing via the meniscus into the rear side of the ribbon.

SUMMARY OF THE INVENTION

It is an object of the present invention to control the heat distribution in the glass feeding into the ribbon via the surface meniscus. Another object is to effect this control in a manner which is convenient and sufficiently flexible to permit the control to be easily adjusted to suit prevailing conditions.

These and other objects of the present invention are achieved by a process of manufacturing flat glass by drawing glass upwardly as a continuous ribbon from a bath of molten glass via a drawing meniscus located at the surface of such bath in a drawing zone into which currents of glass flow in respectively opposite directions along such surface, one such current, the forward current, flowing into such zone from a region to which molten glass is continuously supplied. According to the invention, a predetermined temperature profile is maintained in at least part of such zone by maintaining within the bath beneath that zone part, at least one pool of molten material and thermally conditioning such pool by heat exchange with at least one body and/or by circulating the material of such pool, and/or by giving such pool a predetermined shape.

By this process, it is possible to very easily control the temperature profile, and thus the viscosity profile, of the molten glass which is at any given moment during the glass drawing process flowing into the ribbon via the surface meniscus. This makes it possible to wholly or partially counter the tendency for undesirable temperature inequalities to arise, as discussed above.

The foregoing advantage of the process according to the invention is coupled with the further advantage that at least part of the molten glass flowing into the ribbon via the meniscus flows in contact with a pool of molten material which exercises a very low, and in fact negligible, frictional restraint on the flow of the molten glass.

The pool or pools of molten material have of course to be held by a refractory member or members within the bath of molten glass and that member can serve in the same way as a conventional draw bar to stabilize the position of the meniscus.

In the event that, as is preferred, such pool of molten material is present at least in part beneath the molten glass flowing into the rear side of the ribbon, which molten glass is normally cooler than the molten glass of the forward current, the invention enables the temperature of that cooler molten glass to be increased. The quality of the drawn glass ribbon is thereby improved. Under certain circumstances, where there is a difference in temperature between the currents of molten glass feeding the two sides of the ribbon via the meniscus, the glass ribbon when cooled is found to be bent. Equalizing the temperature of these currents obviates this phenomenon.

If required, heating of the molten pool material underlying the reverse surface current may be accompanied by cooling of molten pool material underlying the forward current so as to equalize the heat distribution between the forward and reverse surface currents and thereby improve the quality of the ribbon for any given drawing speed. By way of example, the temperature of molten pool material underlying the reverse surface current can be increased by heat withdrawn from molten pool material underlying the forward surface current.

If an attempt is made to draw the glass at a speed which is above a certain value, the difference between the viscosity of the reverse surface current and that of the forward current gives rise to a dragging effect which distorts the ribbon. Since the maximum drawing speed is normally limited by the relatively high viscosity of the glass constituting the reverse surface current which feeds the rear side of the ribbon, the invention can be carried out to increase the drawing speed by supplying heat to the reverse surface current by heat exchange with molten pool material to raise the temperature of that current to approximately the same level as the temperature of the forward current. It is not intended, however, that an increase in drawing speed should be achieved in all processes according to the invention.

It is a further advantage of the process according to the invention that the heat distribution in the molten glass feeding the drawing zone and the glass ribbon is influenced in a way which does not involve any risk of adversely affecting the smooth flow of molten glass into the ribbon or giving rise to harmful chemical reactions, e.g. between the molten pool material and the molten glass.

Preferably, the pool or pools provide molten material underlying both the forward and the reverse surface currents at the drawing zone. It is then possible to confer a predetermined temperature profile on the molten glass feeding the front and rear sides of the ribbon and both the currents of glass benefit from the substantially frictionless contact with the molten pool material. Preferably, the pool or pools, as viewed in plan, extend substantially symmetrically to opposite sides of the meniscus. This condition provides the best possibilities for achieving properly balanced thermal conditions between the forward and reverse surface currents feeding the opposite sides of the ribbon. There may, for example, be a single pool of molten material which extends beneath the meniscus and beneath the forward and reverse surface currents at the drawing zone. As an alternative there may be distinct pools of molten material respectively disposed beneath the forward current and the reverse current. In the latter case the thermal action of the different currents of molten glass can be controlled independently.

In certain embodiments of the invention, the pool is thermally conditioned at least in part by withdrawing heat therefrom by heat exchange with at least one body. The performance of the operation of thermally conditioning according to the invention in such a way that heat is withdrawn from molten pool material is a very considerable potential advantage. In particular, by appropriately using the pool or pools as a means of withdrawing heat from molten glass at the drawing zone it becomes possible to achieve dimensional setting of the ribbon in a given time with less reliance on the extraction of heat within the environment through which the ribbon is drawn upwardly from the bath of molten glass.

It is customary, in drawing flat glass, for the continuous ribbon to be drawn upwardly from the bath of molten glass through a drawing chamber and into a contiguous annealing lehr. The lehr may be a vertical lehr surmounting the drawing chamber or a horizontal lehr into which the ribbon is conveyed after being bent about a bending roll located in the upper part of the drawing chamber.

In order to achieve a sufficiently rapid dimensional setting of the ribbon, one or more coolers through which fluid coolant is circulated, are provided within the drawing chamber. It is well known, however, that the presence of such a cooler or coolers, while necessary, has various undesirable side effects due to the incidence of relatively cool gas currents which act upon the surface of molten glass at the drawing zone and upon the faces of the ribbon itself in a way which gives rise to various defects in the geometry of the ribbon. The more intense the action of the cooler or coolers, the more liable is the glass ribbon to suffer from these defects.

By exerting a cooling action on the molten glass at the drawing zone through the agency of the submerged pool or pools of molten material, the amount of cooling required to be effected by the action of a cooler or coolers actually in the drawing chamber in order to bring the ribbon to a dimensionally set state is reduced. Conversely, for a given rate of withdrawal of heat from the ribbon within the drawing chamber under the action of a cooler or coolers located therein, the withdrawal of heat from the molten glass at the drawing zone by heat exchange between the molten glass and submerged pool or pools of molten material enables the drawing speed of the ribbon to be increased.

Preferably heat is withdrawn from the pool only, or to a greater extent, at a region thereof underlying a central portion of the length of the drawing zone. Hereinafter reference to removal of heat "to a greater extent" or "more rapidly" in one area is intended to include the possibility of removing heat only at that area, some removal being "to a greater extent" than no removal.

The "length of the drawing zone" is that horizontal dimension of the drawing zone measured in the direction transverse of the direction of flow of the forward and reverse surface currents of molten glass. In that way, the tendency for the molten glass feeding the marginal portions of the ribbon to be substantially cooler than the molten glass feeding the central part of the ribbon, due to the cooling action of the side walls of the channel along which molten glass feeds to the drawing zone, can be countered and a more favorable temperature profile along the length of drawing zone can be achieved. In consequence, it is in many cases possible to draw a glass ribbon having a greater usable width due to the resulting reduction in the widths of the thickened marginal portions which have to be cut away as waste.

The invention includes processes in which the, or at least one, pool underlies the forward surface current at the drawing zone and heat is withdrawn to a greater extent from molten material of that pool. The effect of adopting this feature is that the viscosities of the currents of glass flowing into the front and rear sides of the ribbon are brought more into balance, which aids the production of flat glass of good optical and geometrical properties and the drawing of flat glass of a given quality at a higher speed.

Advantageously, the thermal conditioning of the molten pool material is achieved at least in part by circulating molten pool material via a path or paths extending outside the pool or pools. Generally speaking, the thermal conditioning can in such cases be more easily effected. Preferably the circulated molten material is cooled outside the pool or pools. In this way it is possible to very easily continuously withdraw heat from the pool or pools in order to keep overlying molten glass below a certain temperature level, for purposes referred to above.

The molten material constituting the pool or pools is preferably of a metallic nature. Preference is given to tin and lead. These materials are not wettable by molten glass and a pool of such a material moreover has very good radiant heat reflecting properties, which is an advantage for achieving uniform heat distribution of the overlying surface currents of glass throughout the thickness thereof under the action of heat radiated onto the surface of the molten glass from the drawing chamber.

The invention also includes apparatus for manufacturing flat glass by drawing. This apparatus includes a feed channel along which molten glass delivered to one end thereof can be continuously fed, and devices for drawing glass upwardly as a continuous ribbon from the surface of the molten glass in such channel at a drawing zone disposed between the one end and a remote end of the channel, so that molten glass flows along such surface in respectively opposite directions into the ribbon via a drawing meniscus. The apparatus according to the invention is provided with at least one refractory member located in the channel and holding at least one pool of molten material within the molten glass in such channel, beneath the drawing zone. For thermally conditioning the pool so as to maintain a predetermined temperature profile in at least part of such zone, structure is provided for causing heat exchange between the material of such pool and at least one body and/or for circulating such material and/or the refractory member is shaped to impose a predetermined shape on the pool.

This apparatus affords the advantage that a predetermined temperature profile can very easily be maintained at the drawing zone, with favorable results on the geometry of the drawn flat glass and on its optical properties.

Various specific embodiments of apparatus according to the invention, embodying certain preferred features, will be described below. The advantages of the various optional features concerned will be appreciated from what has already been stated about the corresponding process features.

Preferably the refractory member or members are located for holding at least one pool of molten material so that, in plan aspect, such molten material extends symmetrically on opposite sides of the drawing meniscus.

In certain apparatus according to the invention there is a refractory member or members for holding two distinct pools of molten material on respectively opposite sides of the drawing chamber.

Preferably cooling devices for cooling molten pool material are provided as the heat exchange structure. Such cooling devices preferably include a cooling tube or tubes located so as to be in thermal contact with the pool and a device is provided for circulating coolant through such tubes. Cooling of molten pool material can thus be effected very effectively and without any risk of affecting the composition of the molten pool material.

The invention includes apparatus in which, for effecting or assisting such thermal conditioning there is provided a circulating arrangement composed of a device or devices circulating molten pool material along a path or paths outside the pool. The thermal conditioning of the pool material can be precisely controlled if an arrangement is provided for circulating the material in that way. Preferably cooling elements are provided for cooling pool material during its traversal of such path or paths outside the pool.

Advantageously there is at least one such refractory member for holding such pool and which extends across substantially the whole length of the meniscus, such member imposing on the pool a shape such that it has, in plan aspect, a central region whose width is less than the width of the end portions of such pool. By imposing such a shape on the pool or pools, the tendency for the margins of the ribbon to become thicker than the central region due to the cooling action exerted by the side walls of the channel along which the molten glass is fed to the drawing zone can easily be obviated or reduced.

The invention includes apparatus in which there is at least one such refractory member which extends over substantially the full length of the drawing zone and whose surface is upwardly convexly curved in the plane formed by the ribbon being drawn. Such member is formed for holding at least one pool which is confined to a central part of the length of such member. By giving a refractory member this physical form it is possible to avoid any tendency for the refractory member itself to contribute toward maintaining the molten glass feeding the margins of the ribbon at a lower temperature, notwithstanding that the refractory member extends over substantially the full length of the drawing zone, i.e., the full width of the drawn ribbon, and that the molten coolant material is confined to a central part of the length of the refractory member.

When employing such a convexly curved refractory member, it is preferably formed for holding a pool or pools which are elliptical, in plan aspect. A pool of that shape contributes particularly well toward attaining a beneficial heat distribution in the meniscus.

In certain embodiments of apparatus according to the invention, there are at least two pools and one such pool is provided with cooling structure independent of any cooling structure provided for the other such pool. Such an apparatus permits a high degree of flexibility in the control of the thermal conditioning.

It is very suitable for the refractory member or members to be made of a refractory metal, preferably tungsten. Alternatively, use can be made of a refractory member or members made of any suitable known ceramic material.

It is also suitable under certain circumstances to vary the level of the molten material in relation to the level of the bath of molten glass, so as to influence the thermal action of the pool or pools of such molten material on the molten glass within the drawing zone.

DESCRIPTION OF THE PREFERRED EMBODIMENTS

Figure 1:
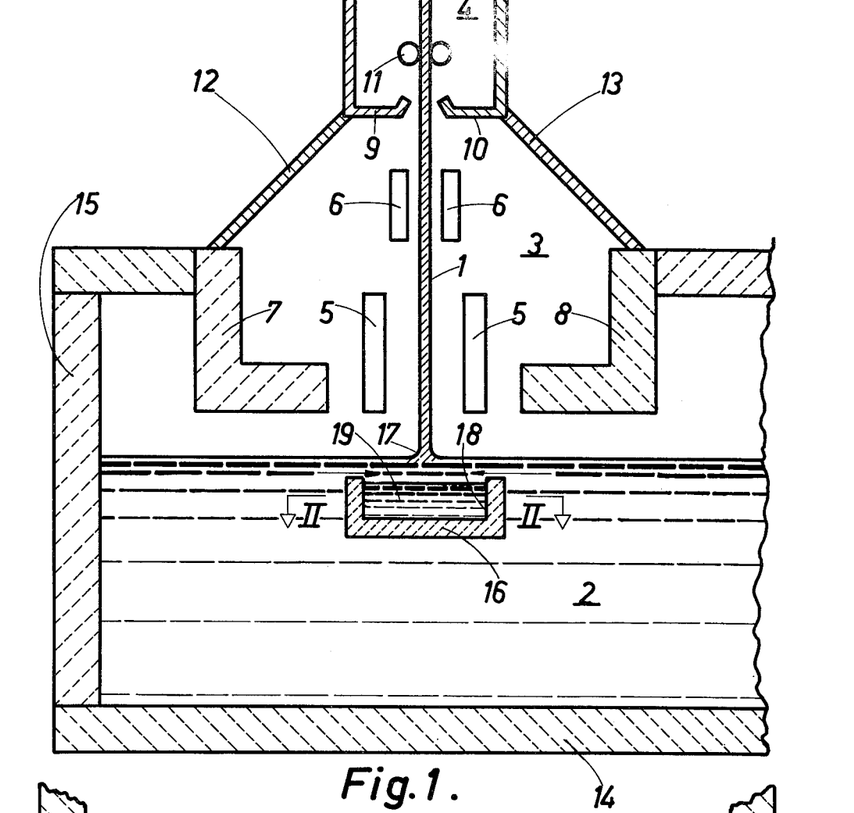
FIG. 1 is an elevational cross-sectional view of part of a drawing chamber for manufacturing flat glass according to one embodiment of the invention.
Figure 2:
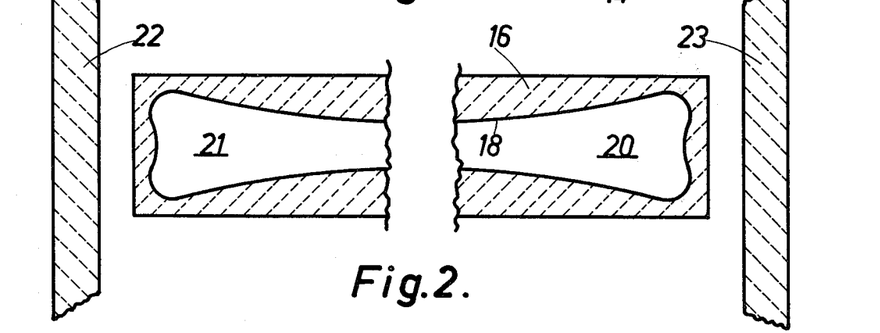
FIG. 2 is a partially broken-away, cross-sectional plan view taken along the line II—II of FIG. 1, but rotated through 90°.

FIGS. 1 and 2 shown an example of the application of the invention to glass drawing by the Pittsburgh process.

A glass ribbon 1 is drawn from a bath of molten glass 2 through a drawing chamber 3 surmounted by an annealing or drawing lehr 4. The drawing chamber is composed, in a conventional manner, of main coolers 5, auxiliary coolers 6, and two L-blocks 7 and 8. The chamber 3 is bounded at the top by catchpans 9 and 10 which separate it from the lehr 4 in which the ribbon is entrained vertically by rollers 11. Chamber 3 is bounded at the sides by side walls 12 and 13 connecting the upper portions of the L-blocks 7 and 8 to the ends of the catchpans 9 and 10.

The bath of glass 2 is contained in a drawing kiln bounded by a bottom 14 and an end wall 15. The bath of glass also comprises in conventional manner a shaped member 16 generally known as a draw bar which is immersed in the bath of glass 2 and extends transversely of the direction of movement of the forward and reverse surface currents of molten glass feeding a drawing meniscus 17.

The drawing meniscus 17 is fed with molten glass from two currents which flow in respectively opposite directions to meet in the drawing zone above the draw bar and form part of a totality of currents whose general configuration is represented by the arrows.

In one embodiment of the invention, the draw bar takes the form of a trough of refractory material whose basin 18 contains a pool of molten material 19 denser than the glass and not wettable by molten glass. One example of such material is molten tin. The basin 18 is given a shape such as that shown in plan aspect in FIG. 2.

This shape has the feature of having a cross section which varies along the length of the draw bar, from one end to the other, so that the ends 20 and 21 of the basin have a maximum cross section, so as to compensate for the harmful effects of the side walls 22 and 23 on the formation of the ribbon edges. It is at these cooler side walls where cool currents of glass originate to feed the ribbon edges and tend to create, in the ribbon marginal edges, faults which can subsequently be eliminated only with great difficulty.

The dimensions of the cross section of the basin 18 at the ends 20 and 21 are so selected as to cause the heat reflecting effect of the metallic pool to compensate for the harmful effect of the side walls 22 and 23. Moreover, the general outline of the basin is such that the metallic pool contained therein reduces differences in temperature along the whole length of the drawing zone, in the direction transverse of the currents of molten glass feeding the meniscus.

In the embodiment shown in FIGS. 1 and 2, the draw bar 16 and the pool of molten material contained within the basin 18 extend across substantially the full length of the drawing zone, and are located substantially symmetrically with respect to the drawing meniscus 17.

Figure 10:
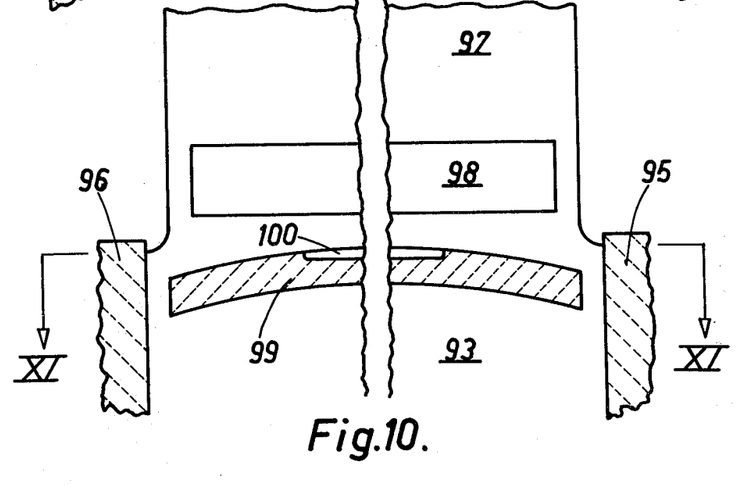
FIG. 10 is a cross-sectional end elevational view of part of a drawing chamber, in the plane of the drawn ribbon, according to yet another embodiment of the invention.
Figure 11:
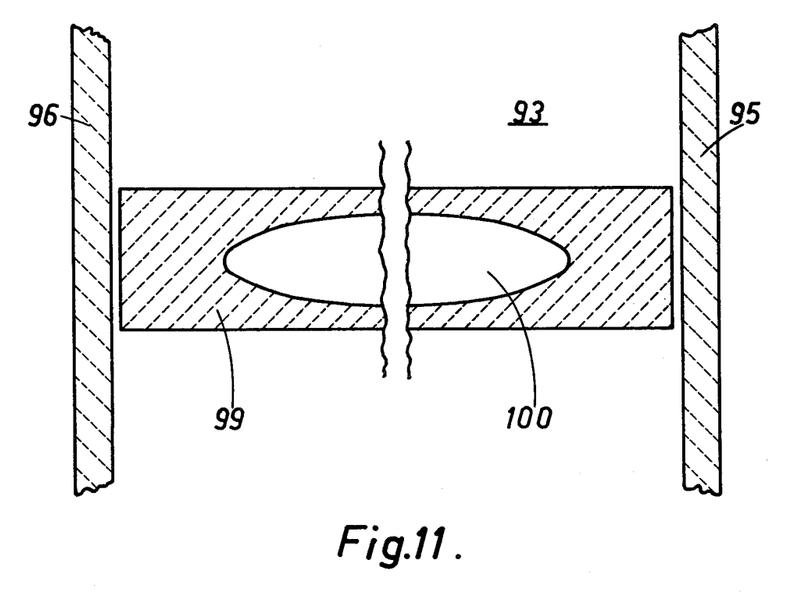
FIG. 11 is a cross-sectional plan view taken along the line XI—XI of FIG. 10.

In one variant of this embodiment however, similar to that shown in FIGS. 10 and 11, the basin containing the pool of molten material is confined to the central portion of the length of the drawing zone. In further variants, the basin containing the pool of molten material is offset to one side or the other within the draw bar and is thus no longer symmetrical with respect to the drawing meniscus.

These latter variants are of importance when it is desired to influence the molten glass feeding one of the forward and reverse surface currents to a greater extent than the molten glass feeding the other surface current. In extreme cases, where it is desired to influence only one of those surface currents, the basin containing the pool of molten material may be located wholly beneath that surface current, so that it is located to one side of the drawing meniscus. This offsetting of the pool of molten material to one side of the drawing meniscus may be accompanied by the provision of a basin of modified shape within the draw bar, for example the pool may be rectangular in plan aspect.

Figure 3:
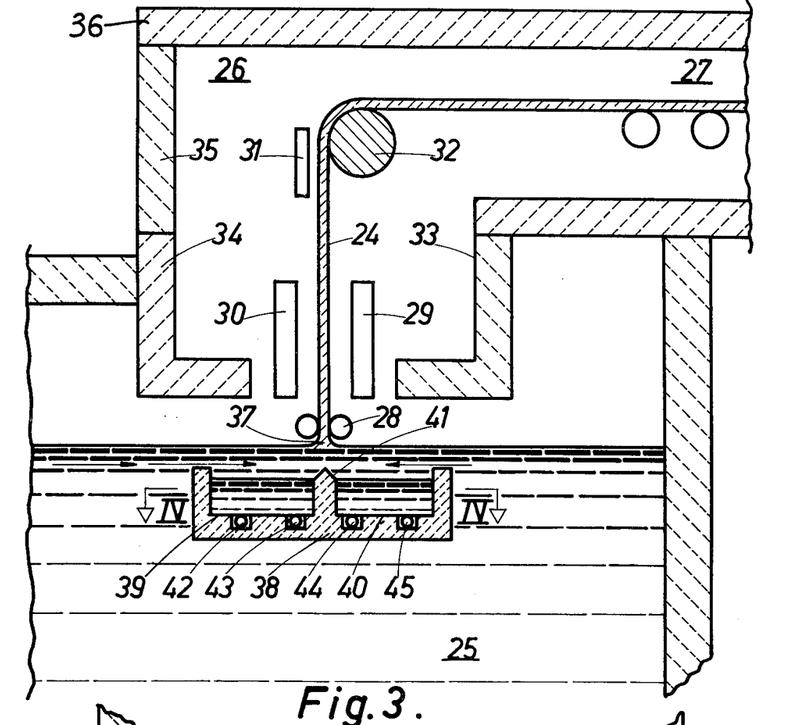
FIG. 3 is a view similar to that of FIG. 1 of part of a drawing chamber for manufacturing flat glass according to a second embodiment of the invention.
Figure 4:
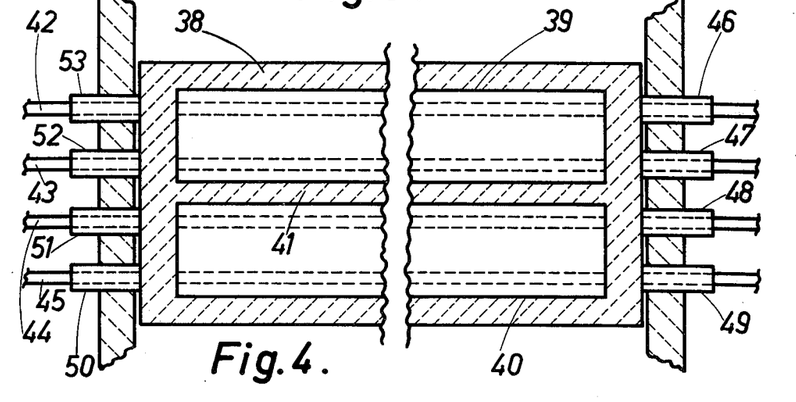
FIG. 4 is a partially broken-away, cross-sectional plan view taken along the ling IV—IV of FIG. 3, but rotated through 90°.

FIGS. 3 and 4 show a second embodiment of apparatus applied to a different kind of chamber for drawing a continuous glass ribbon 24, in which the glass ribbon is bent to the horizontal around a bending roll 32 after having been drawn vertically.

Referring to FIGS. 3 and 4, a glass ribbon 24 is drawn from a bath of molten glass 25 through a drawing chamber 26 towards a horizontal annealing lehr 27. In this process the drawing chamber 26 includes, in a conventional manner, edge rollers 28 which keep the width of the glass ribbon constant, coolers 29 and 30 disposed on either side of the ribbon, and at least one auxiliary cooler 31 disposed substantially at the level of the bending roll 32 but on the other side of the ribbon, therefrom. The glass ribbon 24 is bent around the bending roll 32 and then following a substantially horizontal path. The chamber 26 also includes refractory blocks 33 and 34, for instance L-blocks. The drawing chamber 26 is closed from the outside by walls 35 and 36.

According to the invention, a draw bar 38 in the form of a trough is disposed to be immersed in the bath of glass beneath the drawing zone where the drawing meniscus 37 is formed. In this embodiment, the draw bar has two adjacent pools 39 and 40 separated by a refractory wall 41 and disposed on respectively opposite sides of a vertical plane passing through the drawing meniscus, the pools being filled with a molten metal such as lead. Disposed in the refractory material forming the draw bar are cooling tubes 42, 43, 44 and 45 through which a refrigerating fluid, for instance water, flows. These tubes leave the drawing chamber through suitable orifices and are connected to ducts (not shown) for feeding the refrigerating fluid. Refractory sleeves 46, 47, 48, 49, 50, 51, 52 and 53 protect the tubes from all contact with the molten glass.

When using the embodiment shown in FIGS. 3 and 4, several variants of the process according to the invention may be performed. For example, the arrangement may be such that the pools 39 and 40 are both cooled to the same extent. In alternative arrangements, by adjusting the rate of flow of refrigerating fluid through the tubes 42, 43, 44 and 45, one pool may be cooled to a greater extent than the other. In some cases, one of the pools is not cooled at all, so that only one of the forward and reverse surface currents of molten glass is influenced. It is even possible to circulate a heating fluid, for example a molten metal, through the tubes 42, 43, 44 and 45, or to circulate a refrigerating fluid through the tubes of one pool, and a heating fluid through the tubes of the other pool.

Figure 5:
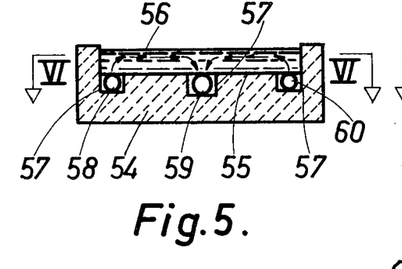
FIG. 5 is an elevational cross-sectional detail view of a draw bar according to a third embodiment of the invention, taken along line V—V of FIG. 6.

FIG. 5 shows, in vertical cross section, a draw bar used in a further embodiment of the invention, immersed as before in a bath of glass, which bath is omitted to simplify the drawing.

Figure 6:
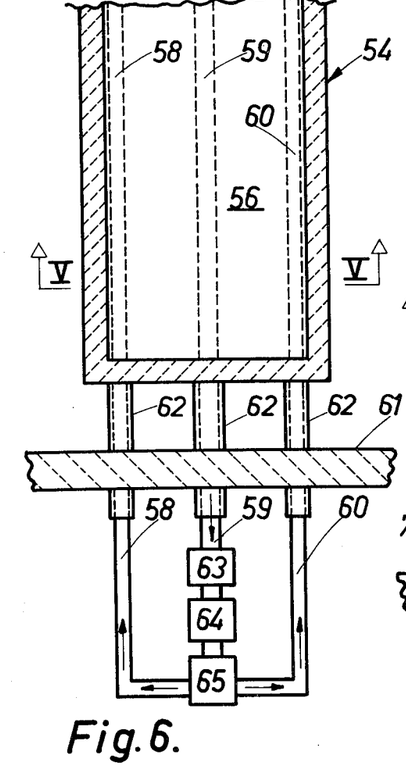
FIG. 6 is a broken-away, cross-sectional plan view, taken along the line VI—VI of FIG. 5.

FIG. 6 is a corresponding partial plan view.

Referring to FIGS. 5 and 6, a draw bar 54 in the form of a trough made of conventional refractory material is formed with a basin 55 containing a pool of molten tin 56. The bottom of the basin 55 is formed with grooves 57 containing tubes 58, 59 and 60. The tubes 58 – 60 extend right through the draw bar longitudinally and leave the drawing chamber via apertures in the side walls 61 of the drawing chamber. Those parts of the tubes which would otherwise be exposed to contact with the molten glass are covered with a protective refractory sleeve 62.

The tubes 58 – 60 are formed with perforations (not shown) spaced apart longitudinally along the tube parts traversing the refractory material forming the draw bar, the perforations being directed towards the pool of molten tin 56.

Outside the drawing chamber the tube 59 is connected successively to a forcing suction pump 63, a device 64 for purifying the molten tin, and a heat exchanger 65 which is also connected to the tubes 58 and 60. In operation, the pump 63 extracts the molten tin which is in the central zone of the pool 55 through the perforations in the tube 59 and first sends the tin to the purifying device 64 and then to heat exchanger 65 which reconditions the molten tin thermally, the tin being reintroduced into the pool 55 via the ducts 58 and 60. The molten tin extracted from the basin 55 may be either cooled or heated by its passage through the heat exchanger 65. This embodiment allows a continuous regular movement of tin all along the drawing bar, such movement being indicated by the arrows in FIG. 5.

Figure 7:
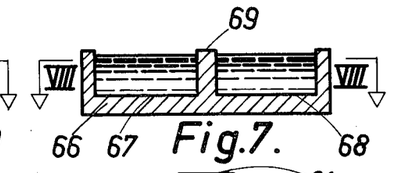
FIG. 7 is a view similar to that of FIG. 5, showing another embodiment of the invention, taken along line VII—VII of FIG. 8.
Figure 8:
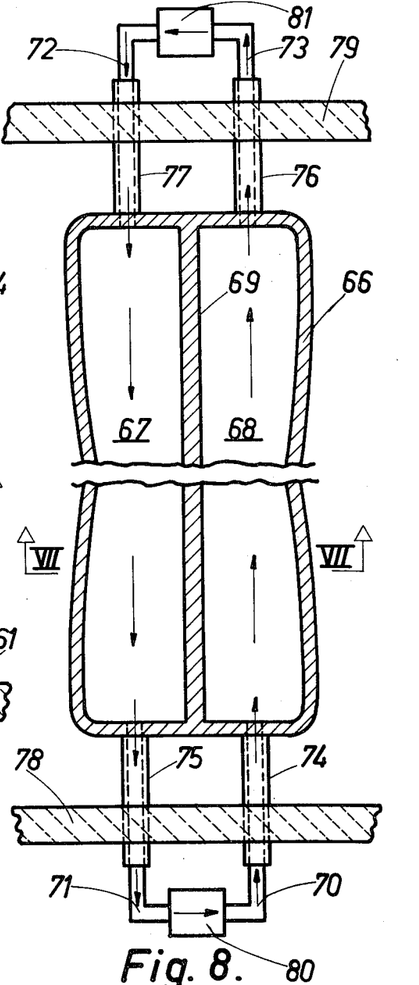
FIG. 8 is a partially broken-away, cross-sectional plan view taken along the line VIII—VIII of FIG. 7.

In another embodiment of the invention shown in FIGS. 7 and 8, use is made of a draw bar in the form of a trough 66 made from a refractory metal such as tungsten, for example. The draw bar contains two pools 67 and 68 juxtaposed and separated by a wall 69 of tungsten. The general shape of the draw bar is similar to that shown in FIG. 2, i.e., the pools, in plan aspect, have a width varying from one end to the other, their maximum widths being at their ends. Tubes 70, 71, 72 and 73 having respective refractory sleeves 74, 75, 76 and 77 extend to the end walls of the pools and leave the drawing chamber through side walls 78 and 79 thereof. The tubes 70 and 71, 72 and 73 are connected to respective electromagnetic pumping devices 80 and 81 which are well known in the art.

In operation, the molten metal is continually moved in the directions indicated by the arrows under the action of the two electromagnetic pumps 80 and 81, to constantly maintain the required temperature profile along the drawing zone.

If needed, purifying and thermal reconditioning devices, as described with reference to FIG. 6, can be added into the molten metal circuits.

Figure 9:
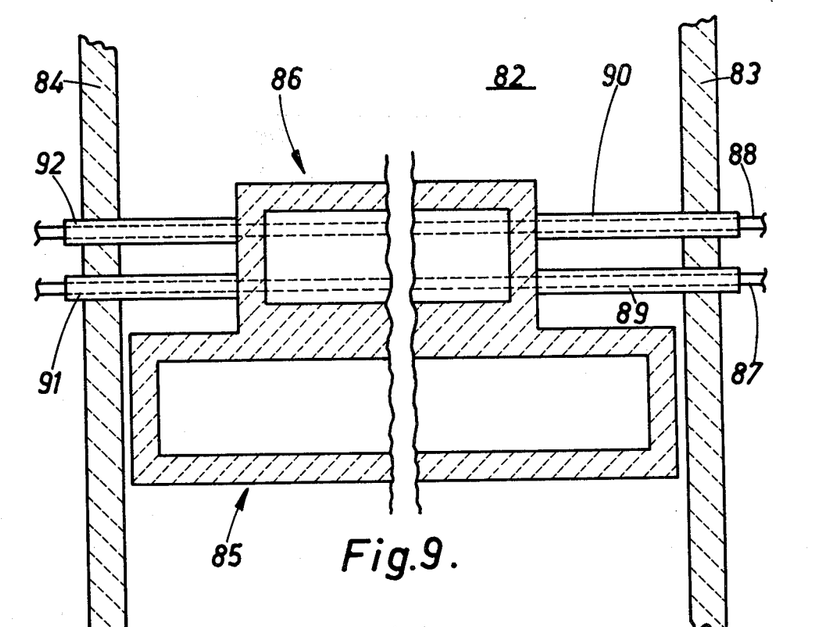
FIG. 9 is a cross-sectional plan view similar to that of FIG. 4 and showing a further embodiment of the invention.

FIG. 9 is a view analogous to that of FIG. 4, and shows a further embodiment of the invention in a partly cross-sectional plan view at the level of the draw bar in the bath of molten glass.

The bath of molten glass 82 is held in a drawing kiln bounded by side walls 83 and 84. In accordance with the invention, the draw bar is constituted by a block of refractory material defining two distinct pools 85 and 86 each lying to a respective side of the drawing meniscus (not visible). The pool 85 is located beneath the reverse surface current of molten glass, and extends substantially the whole length of the drawing zone, from one side wall 83 of the drawing kiln to the opposite side wall 84. The pool 86 on the other hand, which is located beneath the forward surface current, only extends along the central portion of the length of the drawing zone. Tubes 87 and 88, which are analogous to the tubes 42, 43, 44 and 45 shown in FIG. 4, lead through the pool 86 and are insulated from contact with the molten glass in the bath 82 by respective refractory sleeves 89, 90, 91 and 92. In order to thermally condition the molten material, preferably molten metal, held in the pool 86, fluid is circulated through the tubes 87 and 88.

The difference in lengths of the two pools 85 and 86 allows the forward and reverse surface currents of molten glass feeding the drawing meniscus to be thermally conditioned in different ways. The molten glass flowing in the reverse surface current is generally cooler than the molten glass flowing in the forward surface current, and because the pool 85 underlying the reverse surface current extends substantially the whole length of the drawing zone to provide a low-friction surface over which the reverse current may flow, its action is such as to heat the reverse current by the heat reflection and render its temperature more uniform over the whole length of the drawing zone. The pool 86, on the other hand, underlying as it does the central portion of the length of the drawing zone beneath the forward surface current, acts only on the glass flowing in the central portion of the forward current.

The temperature of the pool 86 can be held at a value which is favorable to cooling of the central portion of the forward surface current by heat exchange via fluid flowing through the tubes 87 and 88.

In FIGS. 10 and 11, which show a further embodiment of the invention, a bath of molten glass 93 is held in a drawing kiln having refractory side walls 95 and 96. A ribbon of glass 97 is drawn vertically from the bath 93, and passes in front of a main cooler 98 in the drawing chamber. According to the Pittsburgh process, a draw bar 99 is immersed in the bath of molten glass 93 beneath the drawing zone, symmetrically of the plane of the drawn ribbon, and, according to the invention, the draw bar 99 contains, in the central portion of its upper surface, a pool 100 filled with molten material, for example, tin.

As will be seen from FIG. 10, this embodiment of the invention provides a draw bar which is arcuate in form, its convex surface facing upwardly toward the drawing meniscus and holding, in its central portion, the pool 100 which, as shown in FIG. 11, is of substantially elliptical shape in plan aspect.

It has been found that the embodiment shown in FIGS. 10 and 11 gives an effective solution to the problem of too rapid cooling of the glass feeding the marginal edges of the drawn ribbon as compared with the central portion of the ribbon, and a ribbon of substantially uniform thickness across its whole width is thus obtained.

It will be understood that the above description of the present invention is susceptible to various modifications, changes, and adaptations, and the same are intended to be comprehended within the meaning and range of equivalents of the appended claims.

I claim:

1. In a process of manufacturing flat glass by drawing glass upwardly as a continuous ribbon from a bath of molten glass held in a drawing kiln via a drawing meniscus located at the surface of such bath in the drawing zone of the kiln, into which zone forward and reverse currents of glass, originating from a main current of molten glass which flows into such zone from a region to which glass is continuously supplied, flow in respectively opposite directions along such surface toward the meniscus, the improvement comprising the steps of: maintaining completely immersed in the bath, beneath at least part of the drawing zone and spaced above the bottom of the bath, at least one pool of molten material; providing heat exchange means outside the pool; and withdrawing heat from such pool by effecting a heat exchange between the pool and the means, for maintaining a predetermined temperature profile in such part of the drawing zone, said step of withdrawing heat being carried out to withdraw heat to a greater extent at a region of the bath located at a central portion of the length of the drawing zone than at a region located at an end portion of the length of the drawing zone in a manner to reduce the temperature gradient in the bath along the line between such central and end portions.

2. A process as defined in claim 1 wherein said step of withdrawing heat is carried out by circulating the molten material contained in the pool.

3. A process as defined in claim 2 wherein said step of circulating is achieved at least in part by circulating molten pool material via at least one path extending to the means outside the pool.

4. A process as defined in claim 3 wherein said step of circulating is carried out by cooling such circulated molten material at the means outside the pool.

5. A process as defined in claim 1 further comprising giving the pool a predetermined shape for maintaining such predetermined temperature profile.

6. A process as defined in claim 1 wherein the at least one pool underlies the forward surface current at the drawing zone and there is provided a second pool of molten material underlying the reverse current at the drawing zone, and said step of withdrawing heat is further carried out to withdraw heat to a greater extent from molten material of the pool underlying the forward current than from molten material of the pool underlying the reverse current in a manner to reduce the tempeature difference between the glass in the forward current and the glass in the reverse current at the drawing zone.

7. In a process of manufacturing flat glass by drawing glass upwardly as a continuous ribbon from a bath of molten glass held in a drawing kiln via a drawing meniscus located at the surface of such bath in the drawing zone of the kiln, into which zone forward and reverse currents of glass, originating from a main current of molten glass which flows into such zone from a region to which glass is continuously supplied, flow in respectively opposite directions along such surface toward the meniscus, the improvement comprising the steps of: maintaining completely immersed in the bath, beneath at least part of the drawing zone and spaced above the bottom of the bath, two pools of molten material, with one such pool underlying the forward surface current and the other such pool underlying the reverse current at the drawing zone; providing heat exchange means outside the pools; and withdrawing heat from such pools by effecting a heat exchange between the pools and the means, for maintaining a predetermined temperature profile in such part of the drawing zone, said step of withdrawing heat being carried out to withdraw heat to a greater extent from molten material of the pool underlying the forward current than from molten material of the pool underlying the reverse current in a manner to reduce the temperature difference between the glass in the forward current and the glass in the reverse current at the drawing zone.

8. In apparatus for manufacturing flat glass by drawing, including a feed channel along which molten glass is continuously fed from one end thereof and means for drawing glass upwardly as a continuous ribbon from the surface of the molten glass in such channel at a drawing zone disposed between the one end and a remote end of the channel, whereby molten glass fed from the channel flows along such surface in respectively opposite directions into the ribbon via a drawing meniscus, the improvement comprising at least one refractory member located in said channel and holding at least one pool of molten material completely immersed in the molten glass in such channel, beneath said drawing zone, said refractory member being shaped to withdraw heat from the glass to a greater extent at a central portion of the length of the drawing zone than at the end portions of the length of the drawing zone in a manner to reduce the temperature gradient in the bath along the line between such central portion and such end portions.

9. In apparatus for manufacturing flat glass by drawing, including a feed channel along which molten glass is continuously fed from one end, and a drawing kiln at the other end of the channel, and means for drawing glass upwardly as a continuous ribbon from the surface of the molten glass in the drawing zone of such kiln, into which zone forward and reverse currents of molten glass originating from the main current of molten glass fed by the channel flow along such surface in respectively opposite directions into the ribbon via a drawing meniscus, the improvement comprising at least one refractory member located in said kiln and holding at least one pool of molten material completely immersed in the molten glass in said kiln, beneath said drawing zone, and spaced above the bottom of the molten glass in said kiln, heat exchange means, and cooling means placing said pool in heat exchange communication with said heat exchange means for withdrawing heat from said pool to maintain a predetermined temperature profile in at least part of said drawing zone, wherein said refractory member extends over substantially the full length of the drawing zone and has an upper surface which is upwardly convexly curved in the plane of the ribbon being drawn, and said member is shaped for confining said pool to a central part of the length of said member whereby withdrawal of heat from said pool results in the withdrawal of heat to a greater extent at a region of the bath located at a central portion of the length of the drawing zone than at a region located at an end portion of the length of the drawing zone in a manner to reduce the temperature gradient in the bath along the line between such central and end portions.

10. Apparatus as defined in claim 9 wherein said refractory member is located for holding said pool of molten material so that, in plan aspect, said molten material extends symmetrically on respectively opposite sides of the meniscus.

11. Apparatus as defined in claim 9 wherein said cooling means comprises at least one cooling tube located so as to be in thermal contact with said pool, and means connected for circulating a coolant through said tube.

12. Apparatus as defined in claim 9 wherein said cooling means comprise means for circulating the molten material of said pool for cooling said pool.

13. Apparatus as defined in claim 12 wherein said circulating means comprises a device for circulating molten pool material along at least one path outside said pool.

14. Apparatus as defined in claim 12 wherein said heat exchange means are connected for cooling molten pool material during its traversal of such path.

15. Apparatus as defined in claim 9 wherein said convexly curved member is shaped for imparting to said pool a shape which is elliptical, in plan aspect, to provide substantially more pool area at the center of said pool than at ends thereof.

16. In apparatus for manufacturing flat glass by drawing, including a feed channel along which molten glass is continuously fed from one end, and a drawing kiln at the other end of the channel, and means for drawing glass upwardly as a continuous ribbon from the surface of the molten glass in the drawing zone of such kiln, into which zone forward and reverse currents of molten glass originating from the main current of molten glass fed by the channel flow along such surface in respectively opposite directions into the ribbon via a drawing meniscus, the improvement comprising: at least one refractory member located in said kiln and holding two pools of molten material completely immersed in the molten glass in said kiln, beneath said drawing zone, and spaced above the bottom of the molten glass in said kiln, a first one of said pools being located beneath the forward current and the second one of said pools being located beneath the reverse current; heat exchange means; and cooling means placing at least said first pool in heat exchange communication with said heat exchange means for withdrawing heat from at least said first pool to maintain a predetermined temperature profile in at least part of said drawing zone, said cooling means causing heat to be withdrawn from said first pool to a greater extent than from said second pool in a manner to reduce the temperature difference between the glass in the forward current and the glass in the reverse current at the drawing zone; wherein said first pool is dimensioned to extend only along the central portion of the length of the drawing zone to withdraw heat from glass in the forward current to a greater extent at a central portion of the length of the drawing zone than at the end portions of the length of the drawing zone in a manner to reduce the temperature gradient in the forward current along the line between the central portions and the end portions.

17. Apparatus as defined in claim 16 wherein said cooling means are operatively associated with only said first pool for cooling only the molten material of said first pool.

* * * * *